Aug. 5, 1930.  W. R. DIAMOND  1,772,096
HANDLE
Filed Oct. 17, 1929
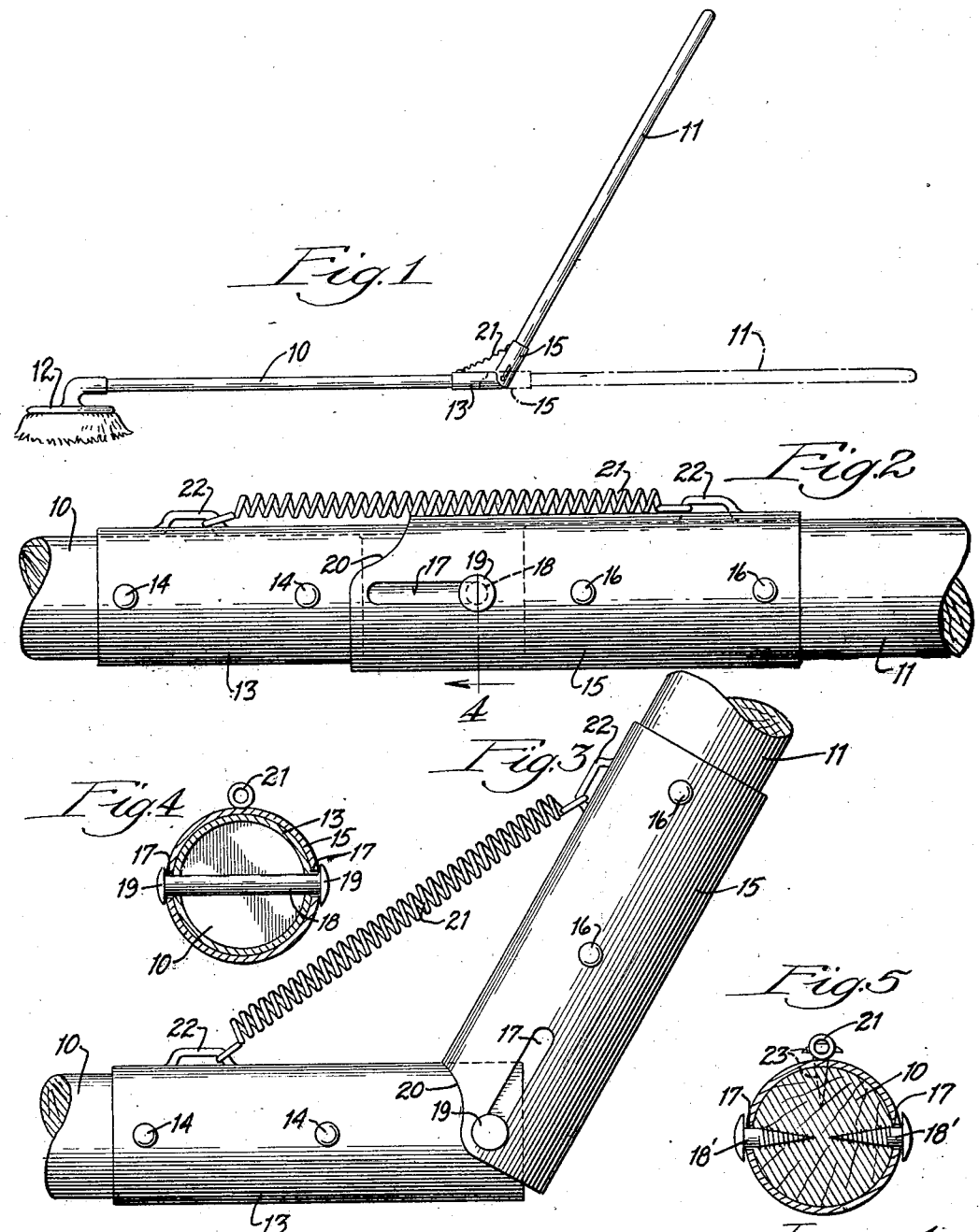

Patented Aug. 5, 1930

1,772,096

UNITED STATES PATENT OFFICE

WILLARD R. DIAMOND, OF CHICAGO, ILLINOIS

HANDLE

Application filed October 17, 1929. Serial No. 400,181.

This invention relates to handles, and particularly to handles for mops, brushes and other cleaning implements.

One of the objects of the invention is to provide an improved handle comprising two parts which are normally retained rigid in aligned relation and which can readily be brought into angular relation so as to facilitate cleaning operations under furniture and other locations which are relatively difficult of access.

Other objects, advantages and capabilities will later more fully appear.

My invention further resides in the combination, construction and arrangements of parts illustrated in the accompanying drawing, and while I have shown herein a preferred embodiment, I wish the same to be understood as illustrative only and not limiting the scope of my invention.

In the drawing,

Figure 1 is a diagrammatic view showing the improved handle applied to a mop,

Fig. 2 is an enlarged view showing, in elevation, the connections between the adjacent parts of the handle, said parts being in rigid and aligned relation, Fig. 3 is a similar view showing the relation of the connections when the parts of the handle are in broken or angular relation, Fig. 4 is a transverse section on the line 4 of Fig. 2, and Fig. 5 is a similar section showing a modified form of the invention.

Referring to the drawing, the handle comprises two parts 10 and 11. The part 10 is attached to a cleaning head 12, which is shown, by way of example, as a mop head of conventional form. Upon the other end of the part 10 is mounted a sleeve 13, which may be attached thereto in any suitable manner, for example, by means of the rivets 14. A similar sleeve 15 is mounted on the adjacent end of the part 11 and is suitably attached thereto by means of rivets 16. The sleeve 15 is larger in diameter than the sleeve 13 so that it can receive the outer end of said sleeve 13 in telescoped relation, as shown in Fig. 2, and provide a rigid connection between the parts 10 and 11.

At its outer end and beyond the end of the part 11, the sleeve 15 is provided with diametrically opposite similar longitudinal slots 17 which approach closely the free end of said sleeve. A pin 18 is carried by the sleeve 13 near its outer end and projects through the slots 17. Said pin 18 may suitably be burred or otherwise provided with heads 19 to prevent the sleeve 13 and 15 from separating. The pin 18 has a free fit in the slots 17 so that relative movement therebetween can readily be effected.

The free end of the sleeve 15 is cut away at 20 between the slots 17, as shown in Figs. 2 and 3, so as to enable the part 11 to be moved into angular relation with the part 10 after said parts have been brought into retracted relation and the pin 18 has been moved thereby to the outer ends of the slots 17. As shown in Fig. 3, the cut away 20 is formed so that said angular movement is limited by contact between the sleeves 13 and 15.

A tension spring 21 is provided longitudinally of the handle and along the side thereof in which the cut away 20 is provided. Said tension spring 21 may suitably be connected to eyes 22 which are stamped up from the remote ends of the sleeves 13 and 15. It will be readily understood from Fig. 2 that the spring 21 normally draws the parts 10 and 11 together and maintains the sleeves 13 and 15 in telescoped relation with the pin 18 at the inner ends of the slots 17. In this position, the conection between parts 10 and 11 is rigid and unyielding, and the telescoped sleeves can not be retracted except by a deliberate pull upon one part while holding the other part of the handle.

When the part 11 is pulled outwardly, relative to the part 10, the pin 18 engages the outer ends of the slots 17 and prevents further movement. The handle may now be broken by moving the part 11 about the pin 18 as an axis. Such angular movement is aided by the spring 21 and is finally terminated by the contact of the cut away portion of the sleeve 15 with the outside of the sleeve 13. The appearance of the handle is now illustrated in full lines in Fig. 1, and it is apparent that the implement mounted upon said handle can be readily used in locations which would otherwise be inaccessible or accessible only with difficulty.

It will be readily understood that my invention is capable of many modifications and changes within the scope of the appended claims. Thus, it is obvious that the slots 17 may be formed in the inner sleeve 13 and that the pin 18 may be mounted in the sleeve 15.

Furthermore, I may omit the sleeve 13 and bring the end of the part 11 into telescoped relation with the sleeve 15, as shown in Fig. 5. In this modification, the pin 18 is replaced by screw nails 18' which are driven through the slots 17 into the part 10. In this modification, one end of the spring 21 is attached to the part 10 by means of a screw nail 23, or by other suitable means.

I claim:

1. A handle of the character described, comprising two parts in telescoped relation, one of said parts being slotted longitudinally, a pin mounted on the other part extending into said slot and resilient means tending to hold said parts in telescoped relation.

2. A handle of the character described comprising two parts in telescoped relation, one of said parts being slotted longitudinally, a pin mounted on the other part extending into said slot, the end of the outer telescoped portion being configured to limit angular movement when said telescoped parts are in retracted relation, and resilient means attached to said parts tending to maintain said parts in telescoped relation and tending to hold said parts in said angular relation when the parts are retracted.

3. A handle of the character described, comprising two parts, the adjacent ends of which are telescoped, one of said ends being slotted longitudinally, the other end being provided with a pin located in said slot, angular movement between said parts being prevented by the telescoped relation, the outer telescoped portion being cut away to permit a relative angular movement between said parts when they are retracted and a spring attached to said parts adapted to maintain same in angular relationship.

4. A handle of the character described, comprising two parts, one of said parts carrying a sleeve adapted to receive the end of the other part in telescoped relation, said telescoped members being provided with a slot and pin connection, the outer end of said sleeve being cut away to permit angular movement between said parts when they are separated within the limits of the slot and pin connection, and a spring connected to said parts in alignment with said cut away portion to tend to maintain said telescoped and said angular relations.

5. A handle of the character described, comprising two parts, sleeves mounted on adjacent ends of said parts, and adapted to be telescoped to provide a rigid connection between said parts, a pin carried by one sleeve extending through slots in the other sleeve, the outer sleeve being cut away to permit relative rotation of the parts about said pin when said parts are separated within the limits of the pin and slot connection, said angular movement being limited by engagement between the cut away portion of the outer sleeve and the inner sleeve, and a spring connected to said sleeves so as to tend to maintain said parts in telescoped relation when they are in alignment and in limited angular relation when they are relatively deflected.

6. A handle of the character described, comprising two parts, sleeves mounted on adjacent ends of said parts and adapted to be telescoped to provide a rigid connection between said parts, a pin carried by the inner sleeve near its outer end extending through longitudinal slots in the outer sleeve, the outer sleeve being cut away between said slots to permit relative rotation of the parts about said pin when said parts are relatively retracted, said angular movement being limited by engagement between the cut away portion of the outer sleeve and the inner sleeve, and a spring connected to said sleeves so as to tend to maintain said parts in telescoped relation when they are in alignment and in limited angular relation when they are relatively deflected.

In testimony whereof, I have hereunto set my hand this 11th day of October, 1929.

WILLARD R. DIAMOND.